United States Patent [19]

Bulters et al.

[11] Patent Number: 5,362,760
[45] Date of Patent: Nov. 8, 1994

[54] TEMPERATURE RESISTANT MICROPOROUS FILM

[75] Inventors: Markus J. H. Bulters, Sittard, Netherlands; Hans K. Van Dijk, Santa Barbara, Calif.; Ronald M. A. M. Schellekens, Meerssen, Netherlands

[73] Assignee: DSM N.V., Netherlands

[21] Appl. No.: 820,977

[22] Filed: Jan. 15, 1992

[30] Foreign Application Priority Data

Jan. 17, 1991 [NL] Netherlands ............ 9100085
Jan. 17, 1991 [NL] Netherlands ............ 9100086

[51] Int. Cl.$^5$ .................. C08J 9/36; B32B 3/26
[52] U.S. Cl. ........................ 521/54; 521/53; 521/918; 428/315.5; 428/315.7; 428/315.9
[58] Field of Search ........ 428/315.5, 315.7, 315.9; 521/53, 54, 918

[56] References Cited

U.S. PATENT DOCUMENTS

| | | | |
|---|---|---|---|
| 4,617,353 | 10/1986 | Myers | 525/245 |
| 4,636,430 | 1/1987 | Moehwald | 428/311.5 |
| 4,824,871 | 4/1989 | Shinomura | 521/54 |
| 4,863,792 | 9/1989 | Mrozinski | 428/315.5 |
| 5,019,260 | 5/1991 | Gsell et al. | 428/315.5 |

FOREIGN PATENT DOCUMENTS 206414 12/1986 European Pat. Off. .
0219063 4/1987 European Pat. Off. .
1234435 9/1989 Japan ...................... 521/53

OTHER PUBLICATIONS

"Preparation and Properties of Conducting Heterocyclic Polymer Films by Chemical Method", by Yoshino, et al. Journal of Applied Physics, 23 No. 12, Dec. 1984, pp. L899–L900.
Skotheim, Handbook of Conducting Polymers, vol. 1, pp. 296, 197.
Derwent Abstract, Mitsubishi Rayon, KK, 08-06-89-J-P-145696 (Jan. 1, 1991) BO1d-53/22 BO1d-71/76, CO1b-13/02 CO1b-21/04, Sepn. of Gas from IXT.—Comprises Placing Mixt. with a Porous Composite Film, Pores Contg. A...
Japan A-01-63021 English Abstract Mar. 3, 1989.
Japan A-03-12214 English Abstract Jan. 21, 1991.

Primary Examiner—George F. Lesmes
Assistant Examiner—Terrel Morris
Attorney, Agent, or Firm—Cushman, Darby & Cushman

[57] ABSTRACT

A microporous film with improved resistance to elevated temperatures from a first, thermoplastic polymer, the internal and external surfaces of the film being provided with a continuous coating layer of a second polymer having a higher softening temperature than the first polymer and process for coating a film of a first polymer with a layer of a second polymer.

9 Claims, 3 Drawing Sheets

TEMPERATURE RESISTANT MICROPOROUS FILM

FIELD OF THE INVENTION

The invention relates to a microporous film from a first, thermoplastic polymer.

BACKGROUND OF THE INVENTION

Such a film is known, for instance, from EP-A-105 629, in which the materials used as thermoplastic polymer include polypropylene, polyethylene, polyethylene terephthalate, polycaprolactam and polyvinylidene fluoride. Depending on their pore dimensions, microporous films are more or less permeable to gases or liquids. They find application in many fields, for instance in filtration of solids, ultra-filtration of colloidal mixtures, as diffusion barrier or separation membrane in electrolytic cells, as selective cleaning filter for liquids, in which capacity they may either be filled or unfilled, and in clothing.

The known films have the disadvantage that their applicability is restricted by the properties of the polymers. This restriction may for instance, originate in the absence of certain desirable properties, such as dimensional stability at higher temperatures, good thermal and/or electrical conductivity, good mechanical properties, such as a high stiffness and a high strength, and resistance to chemical influences. At temperatures above their softening point, and in particular above their melting point, films from thermoplastic polymers undergo distinct changes in a number of essential product properties, for instance, shape and dimensions, porosity and mechanical properties such as strength and modulus. Thus, polyethylene starts to lose its dimensional stability at temperatures from about 80° C., its softening point, while its melting point as a rule is between about 120° and 150° C., so that a film from this polymer can be used only at lower temperatures.

SUMMARY OF THE INVENTION

The object of the invention is to provide a microporous film from a thermoplastic polymer with an improved temperature resistance compared with the known microporous films.

According to the invention this object is achieved in that both the external surface and the internal surface of the film are provided with a continuous coating layer from a second polymer having a higher softening point than the first polymer.

At temperatures below the softening point of the second polymer but above the softening temperature, and even above the melting point, of the first polymer, the microporous film according to the invention appears to retain its shape and dimensions, this dimensional stability accounting for retention of the porosity and permeability, while it appears to possess sufficient mechanical stability for use at the said temperatures. This extension of the temperature range within which the film can be applied increases with the difference between the softening temperatures of the second and the first polymer. The advantage becomes manifest especially in films from thermoplastic polymers with relatively low softening and melting points, such as polyolefins. Preferably, therefore, the first polymer is a polyolefin. Use of the film at higher temperatures than the one at which thermal degradation occurs, either of the thermoplastic polymer or of the coating layer, is to be avoided.

An added advantage of the film according to the invention resides in the fact that the coating layer may be thin, so that the pores are not entirely filled or closed, on account of which the porosity, the primary functional property of the microporous film, is to an important degree retained and the film can be used for the principal ones of the above-mentioned applications. In the light of the above-mentioned applications, the porosity of the film according to the invention preferably is at least 30%, more preferably at least 50%, and most preferably at least 65%. The permeability, expressed as the Gurley value, is better than 100 s/50 ml, preferably better than 70 s/50 ml. It should be noted that a better, i.e. higher, permeability corresponds to a lower Gurley value, expressed in s/50 ml. Thanks to the porosity being retained, the pores of the film according to the invention can optionally as yet be filled with suitable substances that add a desired functionality. Thus, for instance, so-called breathable objects are manufactured by filling a porous structure with a substance which, while being capable of transporting water and releasing it to the environment in the form of vapour, is impervious to water in liquid form. Another example are separation membranes, which can be obtained by filling a porous film with ion-selective substances.

BRIEF DESCRIPTION OF THE DRAWINGS

FIG. 1 also compares the coated film to an uncoated film.

DETAILED DESCRIPTION OF INVENTION

Figure 1:
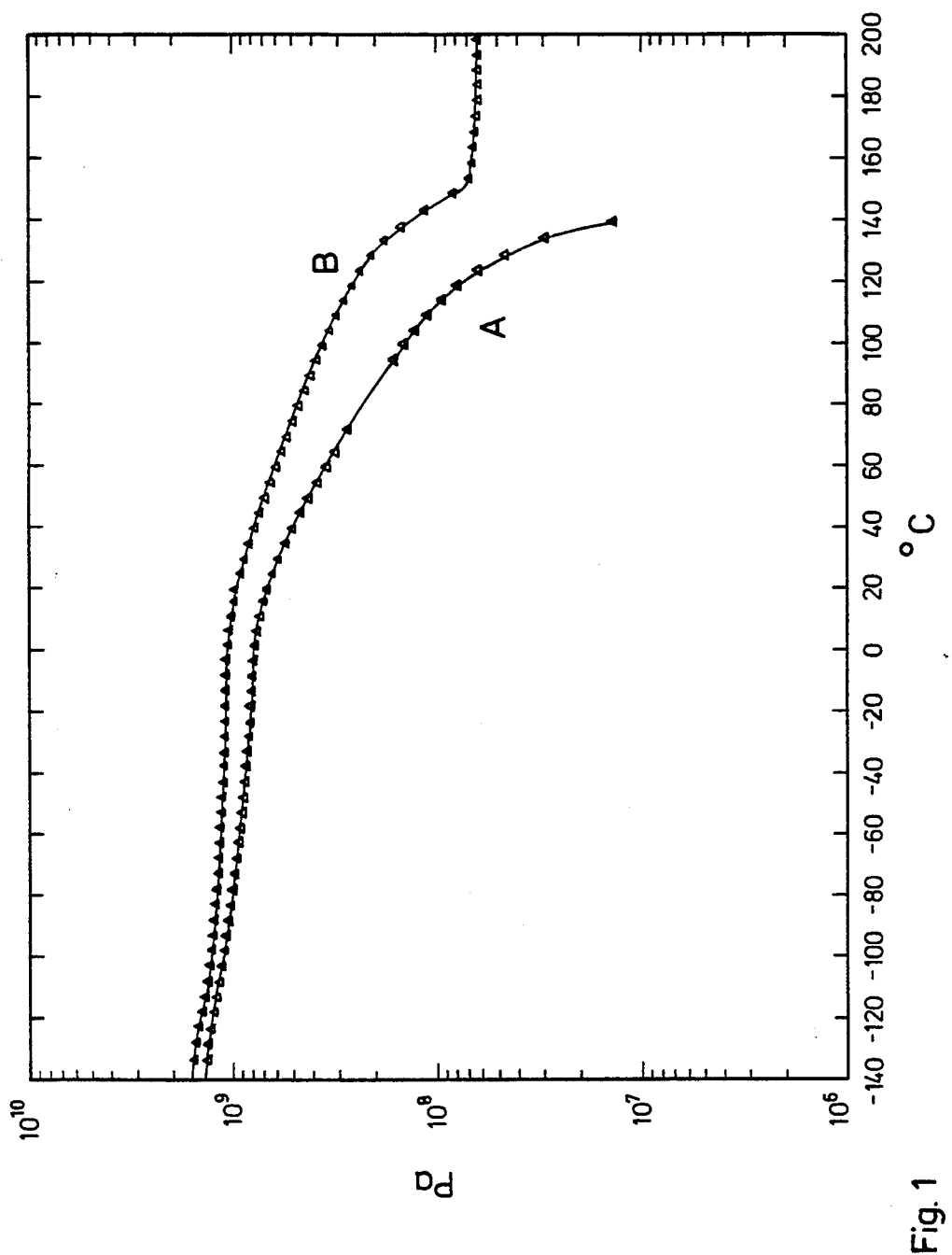
FIGS. 1-3 are graphs depicting the temperature dependence of the dynamic modulus of the coated films of the instant invention.

Porous films of which only the external surface is provided with a coating layer are known, for instance from U.S. Pat. No. 4,194,041. This patent discloses a method for applying a layer of hydrophilic material to a layer of hydrophobic material to serve as a barrier against certain harmful substances. This method, however, requires a lamination step and this involves the disadvantages pertaining to a laminate, such as the risk of delamination under load and exposure of the externally applied coating layer and the non-coated side of the laminate to damaging ambient conditions. Moreover, the coating layer may act as a skin covering the pores and exercise a considerable negative effect on the overall porosity and permeability. In addition, this known film does not appear to possess the temperature resistance inherent in the film according to the invention.

Microporous films the pores of which are completely filled are known, for instance, from U.S. Pat. No. 4,613,544. Here, a hydrophilic material or a precursor thereof is introduced, in the form of a solution, in the pores, where it is converted into the solid state. It is a requirement that the pores are sufficiently filled to prevent material transport, for instance of water, otherwise than by the action of the filler material. Such a filling is certainly suitable for improvement in certain respects of the functionality of the porous structure, but it has as a disadvantage that it greatly reduces the porosity of the total structure. Moreover, also a film manufactured in this way does not appear to possess the temperature resistance that is inherent in the film according to the invention.

For the preparation of microporous films many methods are known. EP-A-105,169, EP-B-160,551 and WO-A-86/02282, for instance, disclose processes for the preparation of porous films starting from a solution of the thermoplastic material. In U.S. Pat. No. 4,833,172 a precursor material consisting of ultrahigh molecular weight polyethylene and a silica-like filling is stretched to obtain a microporous film. Porous structures of polytetrafluoroethylene (PTFE) are known from U.S. Pat. No. 4,110,392 and U.S. Pat. No. 4,187,390.

In the context of the invention a film is to be understood to include foils, tapes and hollow fibres or tubes. The external surface of the film designates the part of the film that is directly exposed to the environment. This external surface substantially comprises the two sides of the film. A microporous film according to the invention may possess a pore system where pores extend from one side of the film to the opposite side without there being contact between the pores. However, preferably the film possesses a pore system consisting of a three-dimensional network of pores ending in both sides of the film, and thus being in open connection with the film's environment. A combination of the two systems is also possible.

The internal surface of the film denotes all of the polymeric material that covers the pores and that is in open connection with the environment through the pores. The form of the pores is not critical, and neither are any specific demands to be met by the tortuosity, that is the average ratio between the length of a path through the pores from an opening in one side of the film to an opening in the opposite side, and the distance, measured in a straight line, between the said openings. The average minimum dimensions of the pores is preferably between 0.001 and 20 μm, and more preferably between 0.01 and 10 μm.

The external surface and the internal surface are to be provided with a continuous coating layer. A continuous coating layer is here understood to include not only a layer covering 100% of the surface area of the first polymer, but also a coating layer that is not entirely closed, with scattered small uncoated portions, the coating layer covering at least 70%, and preferably at least 90%, of the surface area of the first polymer. Most preferably, however, the coating layer fully covers the first polymer.

The coating layer shall be strong enough to withstand the forces, for instance relaxation or expansion forces, which occur upon an increase in the temperature in the first polymer, without substantial dimensional changes, preferably less than 5% in the area of the film. The ratio between the amount of the first polymer and the total coated surface area of the eventual film determines the stress in the coating layer. This ratio, and thus the stress in the coating layer, can be lowered both by increasing the thickness of the coating layer and by starting from a film having a higher porosity in the preparation of the film according to the invention. It should be noted that said measures have a contrary effect on the porosity of the resulting coated film. Depending on the choice of the first and the second polymer and of the intended application and desired porosity, one skilled in the art will be able to determine the most suitable combination of porosity of the starting film and thickness of the coating layer by routine experiments.

The softening temperature is determined as the Vicat temperature according to ASTM D 1525-76 with a weight of 5 kg.

Suitable first polymers are those from which a film with the pore structure described in the above can be prepared. Examples of polymers that are very suitable and have already often been applied for this purpose include polytetra-fluorethylene and polyolefins such as polyethylene and polypropylene.

Eminently suitable thermoplastic-polymeric coating layers are those which essentially consist of a material chosen from the group consisting of polypyrrole, polythiophenes, polyfurans, a substituted form of these, or a mixture of two or more of these substances. A polyethylene film, provided with such a coating layer possesses an excellent electrical conductivity of at least 0.001 S/cm, and in many cases even comparable to that of an object consisting wholly of the coating material. Objects consisting of other polymers with a coating layer of the said materials also prove to be electrically conductive. They also are dimensionally stable at temperatures up to about 350° C., but at these higher temperatures the films appear to loose their electrical conductivity. In addition, the film in this case appears to be dimensionally stable even upon heating to temperatures far above the melting point of the polyethylene, while after cooling the mechanical properties such as strength and stiffness are still very good, comparable to those before heating. By preference, therefore, the coating layer essentially consists of a polypyrrole, a polythiophene, a polyfuran, a substituted form hereof, or a mixture of two or more of these substances.

A very suitable process for the preparation of a film according to the invention comprises the impregnation of the porous film from the first polymer with a mixture comprising a precursor monomer and a catalyst for the polymerization of the monomer to the desired second polymer followed by conversion of the precursor to the monomer and subjecting the film to conditions at which the monomer polymerizes. A precursor monomer is understood to be a molecule which in itself is incapable of polymerization, but which by means of a simple conversion step, for instance the application of heat or light can be converted into a polymerizable monomer, which under the influence of the catalyst present forms the desired polymer. This embodiment has proven to be eminently suitable for the application of a coating layer of polypyrrole, a polythiophene, a polyfuran, a substituted form thereof, or a mixture of two or more of these substances. This embodiment is also suited for the application of a coating layer to only a part of the surface of the film, for instance to one or both outer sides of the film, by applying said mixture only the parts that are to be coated. In this case suitable precursor monomers are molecules having a structure according to formula (I):

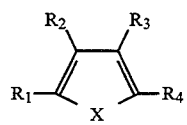

formula (I)

where
X is

—S— or p13 O—;

R₁ is hydrogen, —C(O)OH, —C(O)C(O)OH, —SO₃H, —C(O)H, —I or —Br;

R₂ is hydrogen, an alkyl group (with 1–10 carbon atoms), —C(O)OH, or a halogen;

R₃ is hydrogen, an alkyl group (with 1–10 carbon atoms), —C(O)OH, or a halogen;

R₄ is hydrogen, —C(O)OH, —C(O)C(O)OH, —SO₃H, —C(O)H, —I or —Br;

on the understanding that R₁–R₄ are not all of them hydrogen simultaneously.

Preference is given to the use of pyrrole-2-carboxylic acid. The synthesis of this precursor monomer is described in J. Am. Pharm. Assoc. 45, 509 (1956).

All combinations of X, R₁, R₂, R₃ and R₄ are possible. The R₁ and/or R₄ groups can be eliminated thermally or photochemically while forming a pyrrole, thiophene or furan monomer substituted or not substituted at the R₂ and/or R₃ position. This precursor monomer is thus unblocked and can then polymerize freely via the R₁ and R₄ positions. The R₂ and R₃ groups may be the same, or be different. Possibly R2 and R3 together may complete a cyclic structure. A suitable example is 3,4-(alkylene-vic-dioxy-)-thiophene-2,5-dicarboxylic acid (see Tetrahedron 1967, Vol. 23, p. 2137–2441).

Other suitable precursor monomers which an intrinsically conducting polymer can be prepared with are precursor monomers having a structure according to formula (II):

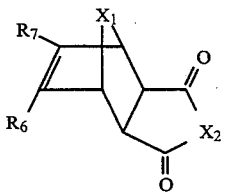

where
X₁ and X₂ are the same or different and are —N—R₅; —S— or —O—;
R₆ and R₇ are the same or different and are hydrogen or an alkyl group with 1–10 carbon atoms;
R₅ is hydrogen, or an alkyl, aryl or alkoxy group.

The precursor monomers according to formula (II) can be synthesized, for instance, as described in J. Chem. Soc. Perkin Trans. I (1985), pp. 1277–1284. Another suitable precursor monomer is 4-amino benzoic acid (see P. Ruelle, 7. Chem. Soc. Perkin trans. II, 1953 (1986). Also 3,4-disubstituted thiophenes (see e.g. U.S. Pat. No. 4,987,042) can be used.

The process according to the invention is not limited to the simultaneous use of precursor monomers of one kind. Combinations of all sorts of precursor monomers are possible. Optionally, precursor oligomers can be used also.

It is noted that Journal of Membrane Science, Vol. 50, 1990, pp. 31–49, describes a process for the preparation of a conductive film in which the film is impregnated with a solution of the monomer of the coating substance and is subsequently contacted with a catalyst for the polymerization of the monomer. If pyrrole is used in this process, the resulting film, while having a good electrical conductivity, is not coated internally and externally with polypyrrole, while it is not dimensionally stable, either.

It is also worth mentioning that properties of thermoplastic polymers other than the dimensional stability may also need improvement. Thus, polymers are generally poor thermal conductors. Furthermore, certain polymers are poorly resistant to certain chemicals and solvents, for which reason they have only limited applicability as a filter medium, though they could be very suitable for this on the basis of their other properties. Polypropylene, for instance, is poorly resistant to many chlorine-containing compounds and strong acids, and PVC to many organic solvents. In particular an object, for instance a film, from a polymer is not resistant to exposure to a solvent for the polymer at a temperature above the dissolution temperature. By a suitable choice of the coating layer also other properties of porous films can be improved or added.

The invention will be elucidated on the basis of the following examples, without being restricted thereto. The measurement values given are determined by the following methods. The softening temperature is determined as the Vicat softening temperature according to ASTM standard D 1525-76, with a weight of 5 kg, using a CEAST 6520 HDT-Vicat apparatus. The Gurley value is a measure for the air permeability and is determined according to ASTM-standard D726-58 using a measuring area of 6.45 cm² (1 sq. inch) and a load of 567 grams. The static mechanical properties are determined using a Zwick 1435 tensile tester at a testing speed of 30 mm/min on a specimen with a width of 10 mm, while the clamping length is 30 mm at 23° C. and 65% relative humidity. The dynamic modulus is determined using a Rheometrics Solid Analyzer RSA-2 at a frequency of 0.2 Hz, a deformation of 0.1% and a heating rate of 5 ° C./min. The conductivity is measured by the so-called four-point method, as described in H.H. Wieder, Laboratory Notes on Electrical and Galvanomagnetic Measurements, Elsevier, New York, 1979. Using this method, the specific conductivity is measured as $$\sigma = (L/A) * (1/R),$$

where
σ = specific conductivity [S/cm]
L = distance between the two innermost electrodes [cm]
R = resistance [Ohm]
A = transverse surface area [cm₂]

EXPERIMENT 1

The Vicat softening temperature of polypyrrole and poly(4-methylthiophene) is determined on pressed specimens. Within the range of the measuring equipment, which runs up to 200° C., the required penetration depth of 1 mm is not reached. It can therefore be concluded that the Vicat softening temperature of polypyrrole and poly(4-methylthiophene) lies above 200° C.

EXAMPLE I 250 mg pyrrole-2-carboxylic acid and 700 mg iron (III) chloride were dissolved in 7 ml tetrahydrofuran (THF) at a temperature of 20° C. From a porous UHMWPE film with an Intrinsic Viscosity of 15.5 dl/g, a porosity of 85% and a Vicat softening temperature of 80° C., hereinafter referred to as basic film, a specimen measuring 2×3 cm² is cut. This specimen is immersed in the solution described for 60 seconds, thus being impregnated with this solution. The film is then removed from the bath and heated for 5 minutes in an oven up to 100° C. The area of the film decreased by about 3%. A black film was obtained. Using acetone, any oligomers formed, residual iron (III) chloride and the iron (II) chloride formed are extracted from the resulting black film. After extraction and drying the porosity of the resulting, internally and externally coated film is 66%. From the weight increase of the film it follows that the film's polypyrrole content amounts to 13.8 wt. %. The specific conductivity of the film is 1.1 S/cm, calculated on the basis of the film dimensions. For the basic film, the breaking strength, elongation at break and force needed for 1% elongation are 30 N/25 mm, 23% and 2.0 N/25 mm, respectively, and for the polypyrrole-coated film they are 36 N/25 mm, 26% and 2.3 N/25 mm, respectively. The mechanical properties of the coated film therefore virtually agree with those of the basic film. The temperature dependence of the dynamic modulus of the basic film and that of the coated film are determined and presented in FIG. 1. In this figure, the temperature in °C. is plotted on the horizontal axis and the dynamic modulus in Pa on the vertical axis. The modulus of the basic film, curve A, decreases strongly near the melting point of the polyethylene, to fall to zero at the melting point. The modulus of the coated film, curve B, initially decreases with increasing temperature, but reaches a plateau value of over 60 MPa, which remains at the same level up to about 350° C., though the figure only goes to 200° C.

EXAMPLE II

Example I was repeated with a PE-film with a porosity of 84%, a Gurley value of 2.4 s/50 ml. The porosity and Gurley value of the coated film were 69% and 36.4 s/50 ml. resp. The coated film was kept in an oven at 180° C. for 1 hour and cooled to room temperature. The porosity and Gurley value then were 63.5% and 30 s/50 ml resp.

EXAMPLE III

Figure 2:
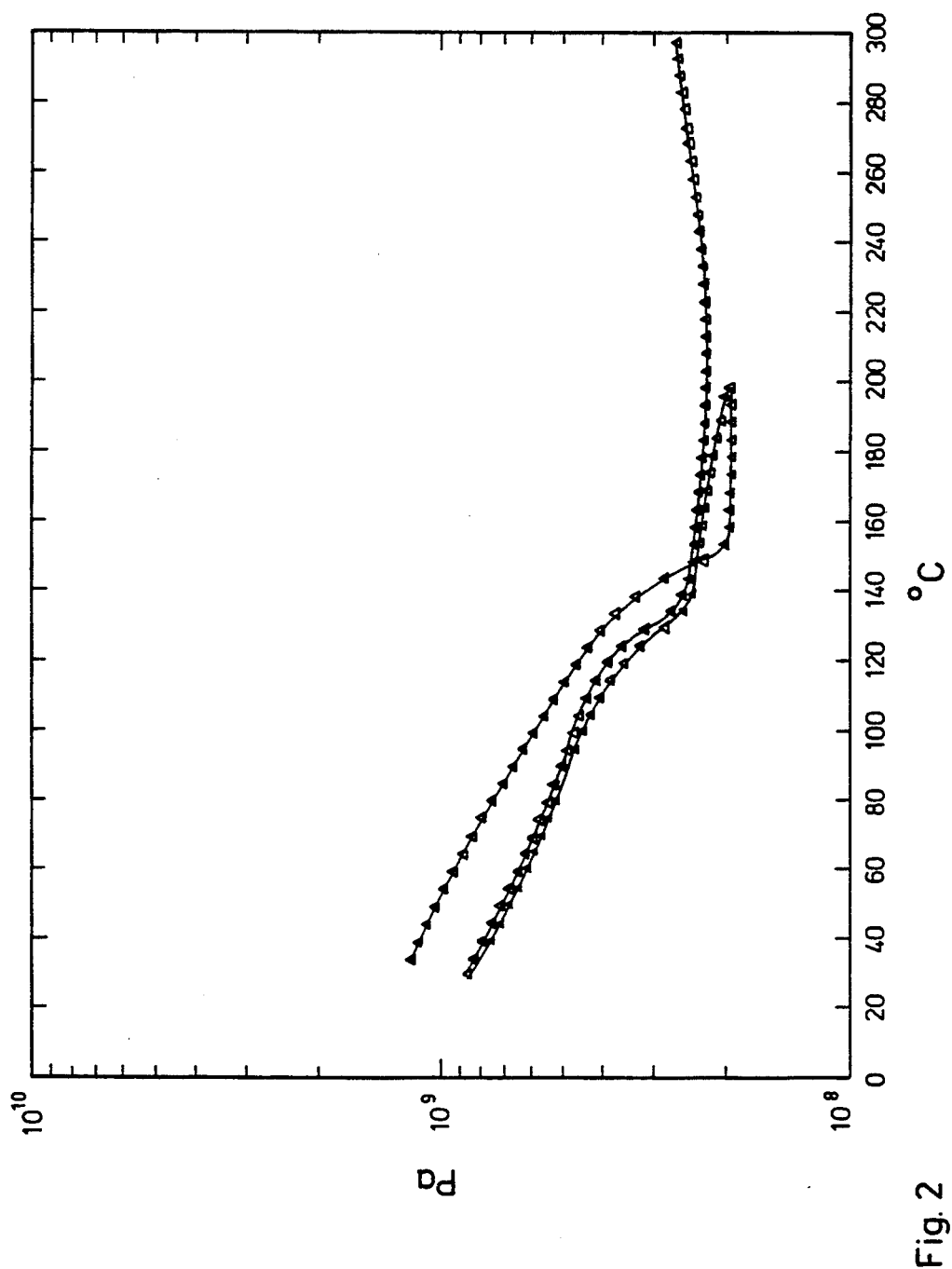

A polypyrrole-coated polyethylene film is prepared as described in Example I, except that dissolving takes place in 5 ml tetrahydrofuran. FIG. 2, with the temperature in °C. plotted on the horizontal axis and the dynamic modulus in Pa on the vertical axis, shows the changes in the dynamic modulus of the coated film upon, successively, heating from room temperature to 200° C., cooling to room temperature, and re-heating to 300° C. From FIG. 2 it appears that after heating to 200° C., at temperatures below the melting point of polyethylene the modulus of the coated film is approximately 85% of its original value, while above the melting point the modulus is retained completely.

COMPARATIVE EXAMPLE A

Of a fully polyurethane-filled porous High-density polyethylene (HDPE) film (Thintech ®, make 3M) the temperature dependence of the dynamic modulus is determined. At 120° C., the melting point of the HDPE, this modulus is only 5 MPA, decreasing rapidly to almost zero upon an increase in temperature. This behaviour is fully in line with curve B in FIG. 1. The stressed film first undergoes a distinct dimensional change in the form of contraction and finally breaks.

COMPARATIVE EXAMPLE B

A UHMWPE basic film as described in Example I is immersed in a solution of 10 vol. % pyrrole in chloroform. After impregnation the film is air-dried for 10 seconds. The pyrrole-filled film is immersed in an aqueous 2.88 M iron (III) chloride solution for 30 minutes. From the resulting black film the excess reagents are removed, first with water and then with acetone, following which the film is dried. Microscopic examination of a cross-section of the film reveals that the pyrrole is present mainly on the external film surface. The electrical conductivity of the film is 0.6 S/cm. After extraction and drying, the film is heated to 180° C., yielding a corrugated film with scalloped edges. In contrast with the film according to the invention, the film thus coated with pyrrole therefore is not dimensionally stable at this elevated temperature.

COMPARATIVE EXAMPLE C

A porous PE-film with a porosity of 81% was immersed for 1 hour in a saturated solution of $FeCl_3.6H_2O$ in methanol. The surplus of solution then was removed with tissue-paper. The film coated with $FeCl_3$ was exposed in a closed vessel to vapour of pyrrol during 6 hours. A grey-to-black film was obtained in this way. The film was still permeable to air (Gurley value of 77 s/50 ml). After exposure to a temperature of 180° C. for 1 hour the film had shrunk into a black lump, indicating that the internal and/or external surface of the film were not provided with a continuous layer of polypyrrol.

EXAMPLE IV

At a temperature of 20° C. 500 mg thiophene-3-methyl-2-carboxylic acid is dissolved in 1 ml THF. A solution of 1.2 g $FeCl_3$ in 3 ml methanol is added to this solution. During 30 seconds a porous PE film with a porosity of 85% is impregnated with the resulting solution, after which the impregnated film is heated at 120° C. for 5 minutes. A PE film is obtained the pores and the outside of which are covered with a continuous layer of poly (4-methylthiophene). The entire film has a specific conductivity of 0.5 S/cm. The porosity and the Gurley value of the coated film are 73% and 15 s/50 ml.

EXAMPLE V

In a mixture of 1.5 ml THF and 1.5 ml methanol, 250 mg pyrrole-2-carboxylic acid and 700 mg $FeCl_3$ are dissolved. A PTFE film ($2 \times 3$ $cm^2$, GORE-TEX$^R$ from Gore) having a thickness of 35 μm is immersed in this solution for 5 minutes. The impregnated film is subsequently heated for 5 minutes at 100° C., After extraction with acetone the specific conductivity of the resulting polypyrrole-coated PTFE film is measured. It is found to be 0.6 S/cm. The Vicat softening temperature of the PFTE is below room temperature.

EXAMPLE VI

Figure 3:
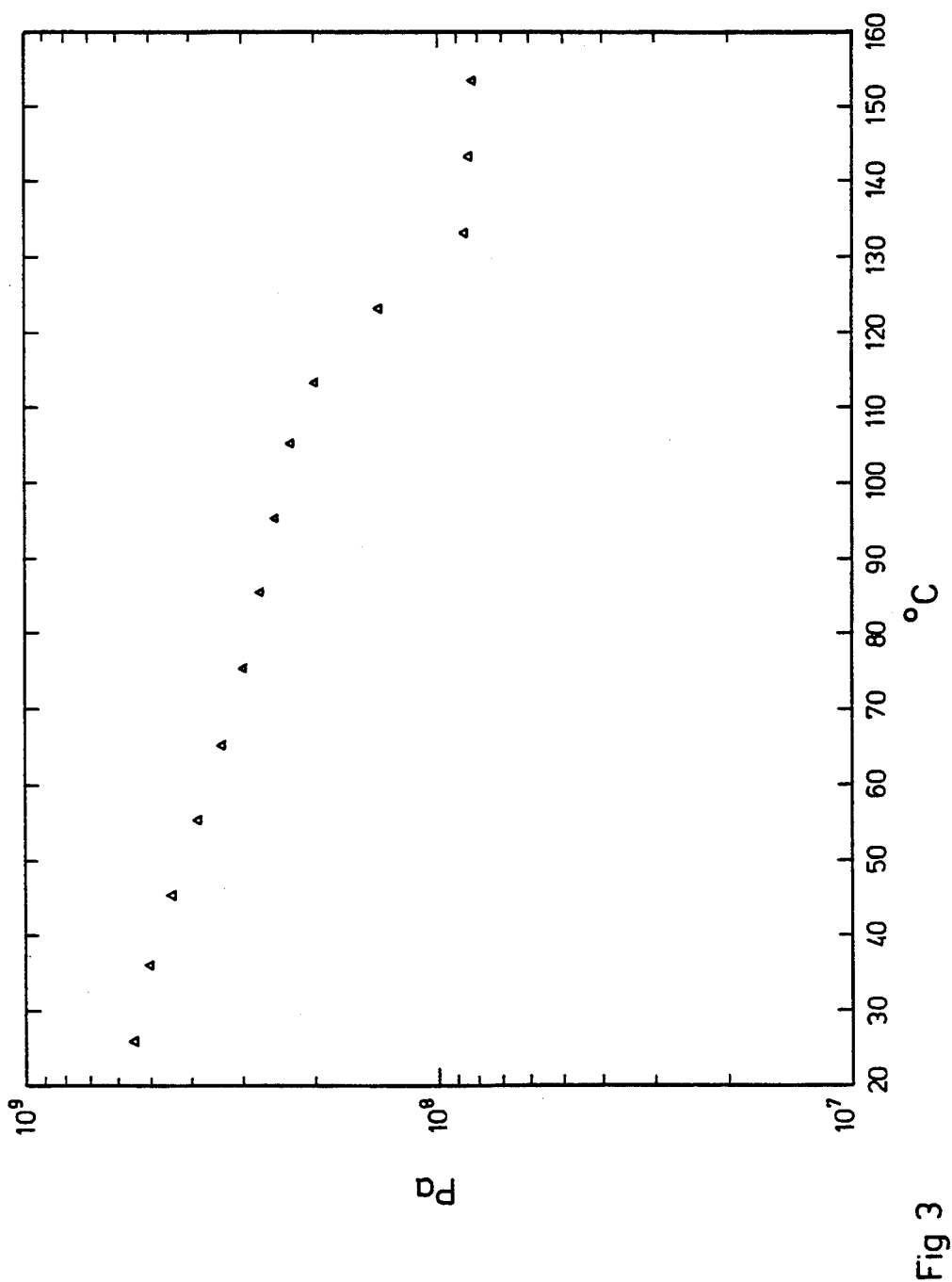

Example V is repeated, but now a microporous HDPE film ($2 \times 3$ $cm^2$) is impregnated (this film is described in U.S. Pat. No. 4,613,544). The thickness of this film is 30 μm and the softening temperature is 48° C. The impregnated film is heated for 3 minutes at 100° C. After extraction with acetone a conductivity measurement on the resulting film yields a value of 0.8 S/cm. The film proves to be dimensionally stable at temperatures up to at least 200° C. The changes in the dynamic modulus as a function of the temperature are presented in FIG. 3, in which the temperature in °C. is plotted on the horizontal axis while the dynamic modulus in Pa is plotted on the vertical axis. At 200° C. the dynamic modulus of the film is 80 MPa.

EXAMPLE VII

A polyethylene film measuring 2×3 cm², internally and externally coated with polypyrrole and prepared by the process of Example I is kept in a decalin bath at 180° C. for one hour. The dimensions and the porosity of the film remain unchanged.

We claim:

1. A process for at least partially coating a microporous film of a first polymer with the layer of a second polymer comprising:

applying a mixture comprising a precursor monomer of the second polymer and catalyst to the portions of a surface of the microporous film to be coated, wherein said precursor monomer is at least one monomer selected from the group of monomers represented by formulas (I) and (II), wherein formula (I) is

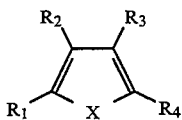

(I)

wherein said formula (I) X is selected from the group consisting of

—S—, and —O—;

$R_1$, is selected from the group consisting of hydrogen, —C(O)OH, —C(O)C(O)OH, —SO$_3$H, —C(O)H, —I, and —Br;

$R_2$ is selected from the group consisting of hydrogen, a $C_1$ to $C_{10}$ alkyl group, —C(O)OH, and a halogen;

$R_3$ is selected from the group consisting of hydrogen, a $C_1$ to $C_{10}$ alkyl group, —C(O)OH, and a halogen;

$R_4$ is selected from the group consisting of hydrogen, —C(O)OH, —C(O)OH, —SO$_3$H, —C(O)H, —I, and —Br, wherein $R_1$ and $R_4$ are not both hydrogen, and wherein formula (II) is

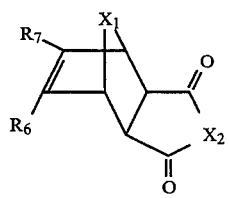

(II)

wherein formula (II) $X_1$ and $X_2$ are the same or different and are selected from a group consisting of —S—, —O—, >N—R$_5$, R$_6$ and R$_7$ are the same or different, and are selected from the group consisting of hydrogen and $C_1$ to $C_2$ alkyl, and wherein R$_5$ is selected from the group consisting of hydrogen, alkyl, aryl and alkoxy;

converting the precursor monomers to corresponding polymerizable monomers; and subjecting the film to conditions under which the catalyst causes the monomers to polymerize, forming the second polymer.

2. Process according to claim 1, wherein the mixture contains a solvent for the precursor monomer.

3. Process according to claim 1, wherein the conversion of the precursor monomer is induced by thermal treatment.

4. Process according to claim 1, wherein the second polymer has a higher softening temperature than the first polymer.

5. Process according to claim 1, wherein the first polymer is polyethylene.

6. Process according to claim 1, wherein the second polymer is selected from the group consisting of polypyrrole, polythiophenes, polyfurans, substituted polypyrrole, substituted polythiophenes, substituted polyfurans, and mixtures thereof.

7. A process for at least partially coating a microporous film comprised of a thermoplastic polymer with a coating layer of another polymer comprising:

applying a mixture comprising a precursor convertible to a monomer and a catalyst for the monomer to at least a portion of a surface of the microporous film, said precursor having the formula (I):

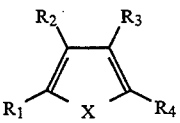

formula (I)

wherein:

X is selected from the group consisting of

—S—, and —O—;

$R_1$ is selected from the group consisting of hydrogen, —C(O)OH, —C(O)C(O)OH, —SO$_3$H, —C(O)H, —I, and —Br;

$R_2$ is selected from the group consisting of hydrogen, a $C_1$ to $C_{10}$ alkyl group, —C(O)OH, and a halogen;

$R_3$ is selected from the group consisting of hydrogen, a $C_1$ to $C_{10}$ alkyl group, —C(O)OH, and a halogen;

$R_4$ is selected from the group consisting of hydrogen, —C(O)OH, —C(O)OH, —SO$_3$H, —C(O)H, —I, and —Br, wherein $R_1$ and $R_4$ are not both hydrogen;

converting the precursor to the monomer by heating or irradiating, and polymerizing the thus obtained monomer in the presence of the catalyst and wherein the dimensional stability of said microporous film is maintained at a temperature above the melting point of said thermoplastic polymer.

8. Process according to claim 7, wherein the precursor convertible to the polymerizable monomer is pyrrole-2-carboxylic acid.

9. Process according to claim 7, wherein the film to be coated comprises porous ultra high molecular weight polyethylene, a microporous high density polyethylene, or porous polytetrafluroethylene.

* * * * *